INVENTOR.
ADOLPH BLICHER
BY Glenn H. Bruestle
Attorney

INVENTOR.
ADOLPH BLICHER
BY
Glenn H. Bruestle
Attorney

United States Patent Office 3,439,236
Patented Apr. 15, 1969

3,439,236

INSULATED-GATE FIELD-EFFECT TRANSISTOR WITH CRITICAL BULK CHARACTERISTICS FOR USE AS AN OSCILLATOR COMPONENT

Adolph Blicher, North Plainfield, N.J., assignor to Radio Corporation of America, a corporation of Delaware

Filed Dec. 9, 1965, Ser. No. 512,635
Int. Cl. H01l *11/14*
U.S. Cl. 317—235 12 Claims

ABSTRACT OF THE DISCLOSURE

A device is provided comprising a body of a material selected from the group consisting of GaAs, InP, $GaAs_{1-x}P_x$, where $x$ is less than one. Immediately adjacent one body surface are two $N^+$ regions separated by an N type region. Two ohmic electrodes are attached to the two $N^+$ regions respectively, and a potential is applied between these two electrodes sufficient to maintain an electric field of about 3600 volts per centimeter in the N type region. Means such as an insulated-gate control electrode are provided over the N type region to vary the concentration of electrons in the N type region so that the product of the electron concentration per cm.$^3$ in the N type region times the length in centimeters of the N type region may be varied from a value above about $10^{11}$ per cm.$^2$, when oscillations will occur, to a value below about $10^{11}$ per cm.$^2$, when oscillations will cease.

BACKGROUND OF THE INVENTION

This invention relates to improved bulk effect semiconductor devices, and more particularly to improved bulk effect semiconductor devices provided with control electrodes.

DESCRIPTION OF THE PRIOR ART

In one type of bulk effect device, a high electrical field is applied to a homogenous body of N type gallium arsenide or indium phosphide by means of two ohmic electrodes. Provided that this field reaches a specific threshold value, which is about 3600 volts per centimeter for N type gallium arsenide, and provided that the product of the electron concentration per cm.$^3$ in the N type semiconductive body times the distance in centimeters between the two ohmic electrodes is greater than about $2\times10^{12}$ per cm.$^2$, then current oscillations will occur between the two ohmic electrodes at a frequency $f$, which is approximately equal to $V/L$, where V is the velocity in centimeters per second of electrons in the semiconductor at the threshold field, and L is the distance in centimeters between the two ohmic electrodes. For N type gallium arsenide, V is about 10 centimeters per second. When L is about 2 mils or 50 microns, then the oscillation frequency is about 2 gigacycles per second. Decreasing the distance between the two ohmic electrodes increases the frequency of the oscillations in the same proportion. When L is less than 25 microns, the required threshold field may be more than 3600 volts per centimeter. Magnetic fields are not required for this device. See, for example, J. B. Gunn, "Instabilities of Current in III–V Semiconductors," IBM Journal, April 1964, pp. 141–159.

Although very high frequency oscillations can thus be generated, the device is essentially a two-terminal device, and hence is subject to the limitations common to all two-terminal devices, particularly the difficulty in separating input from output. Moreover, two-terminal devices can only be modulated by switching the bias voltage on or off. Furthermore, the output frequency of the two-terminal device appears to be fixed by the geometry of the unit, and cannot be readily controlled.

Accordingly, it is an object of this invention to provide an improved bulk effect device.

Still another object is to provide improved bulk effect devices having control electrodes.

SUMMARY OF THE INVENTION

These objects are accomplished by providing a semiconductor device comprising a body of gallium arsenide or indium phosphide having two spaced ohmic electrodes attached to one face thereof. An N type region is provided in said body immediately adjacent said one face and between said spaced electrodes. At least one control electrode is provided on said one major face. Suitably, the control electrode is an insulated-gate field-effect electrode, that is, an electrode deposited on an insulating coating over the portion of said one major face immediately adjacent said N type region.

The invention will be described in greater detail by the following examples, considered in conjunction with the accompanying drawing, in which:

THE DRAWING

THE PREFERRED EMBODIMENTS

*Example I*

Figure 1:
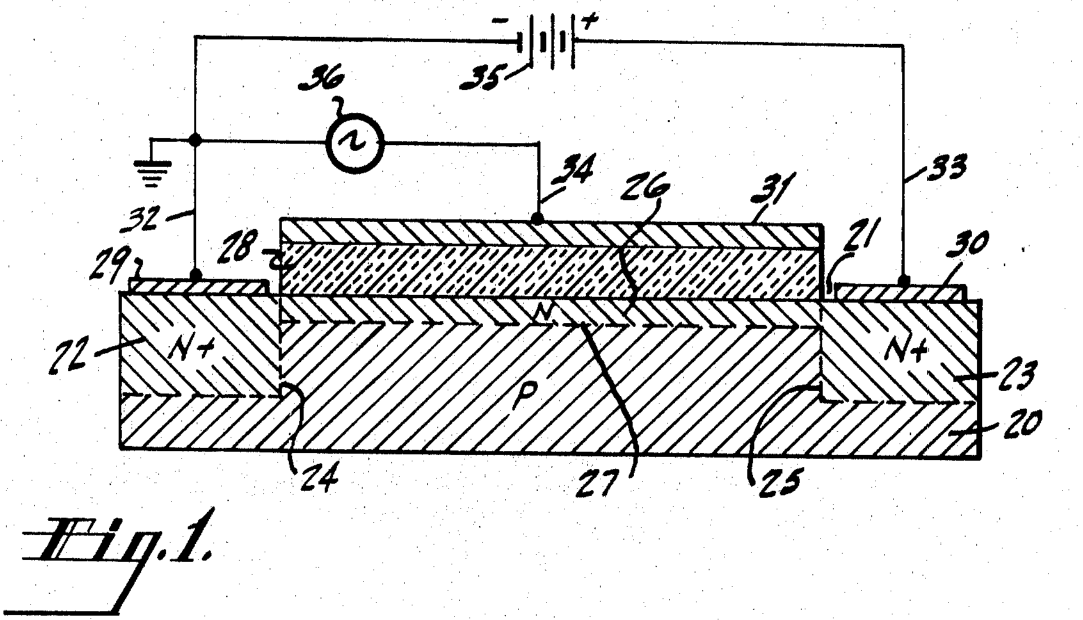
FIGURE 1 is a cross-sectional view of a bulk effect semiconductor device having a control electrode according to a first embodiment.

Referring now to FIGURE 1, a bulk effect semiconductor device according to a first embodiment comprises a body or wafer 20 of P type monocrystalline gallium arsenide having a major face 21. Two spaced high conductivity $N^+$ type regions 22 and 23 are formed in wafer 20 immediately adjacent major face 21 by standard techniques of the semiconductor art, for example by diffusing into the wafer a donor such as sulfur, selenium, tellurium, or tin. Rectifying barriers or PN junctions 24 and 25 are formed at the boundaries between the donor-diffused spaced regions 22 and 23 respectively and the P type bulk of wafer 20. Hereinafter, and in the drawing, highly doped high conductivity N type semiconductive regions having a high concentration of negative charge carriers (electrons) are designated as $N^+$.

The precise distance between $N^+$ regions 22 and 23 is not critical, and may be varied from about 100 mils to a few microns. However, since the period of the oscillations produced is approximately equal to the time required for charge carriers (electrons) to travel between the two spaced $N^+$ regions 22 and 23 under the influence of a high potential field, the frequency of the device oscillations is doubled as the space between $N^+$ regions 22 and 23 is halved. In this example, the spacing or distance between $N^+$ regions 22 and 23 is about 0.5 mil.

Next, a second diffusion step is performed on predetermined surface portions of the wafer 20 utilizing a donor such as sulfur, selenium, tellurium, or tin, to form an N type conductivity region 26 immediately adjacent wafer face 21 between $N^+$ regions 22 and 23. However, the second diffusion step is performed at either a lower temperature, or for a shorter period of time, or with a more dilute concentration of the conductivity modifier source, or with a combination of these conditions, so that N type region 26 is thinner and of higher resistivity than the N+ spaced regions 22 annd 23. The N+ regions 22 and 23 may be exposed during the second diffusion step, since the donor concentration in these regions will not be significantly changed by the second diffusion. A rectifying barrier or PN junction 27 is formed at the boundary between the donor-diffused N type region 26 and the P type bulk of wafer 20.

An insulating coating or layer 28 is deposited on that portion of wafer face 21 immediately adjacent N type region 26 by any convenient method, such as by evaporation. Insulating coating 28 may consist of silicon monoxide, silicon dioxide, magnesium fluoride, magnesium oxide, or the like, and is suitably about 500 to 5000 A. thick. Alternatively, a silicon oxide coating may be deposited on wafer face 21 at low temperatures by decomposing a siloxane compound and forcing the decomposition products through a jet to impinge upon the wafer, as described in U.S. Patent 3,114,663, issued Dec. 17, 1963 to J. Klerer.

Two metallic electrodes or contacts 29 and 30 are formed on wafer face 21 to the two spaced N+ regions 22 and 23 respectively. The contacts 29 and 30 should be ohmic in character. Since tin is a donor in gallium arsenide, the ohmic contacts 29 and 30 are conveniently formed by alloying two tin dots to face 21 of wafer 20.

A metallic control or gate electrode 31 is deposited on insulating coating 28 over N type region 26 by standard techniques of the art, for example by evaporation of aluminum thereon. The control electrode 31 is between electrodes 29 and 30, but spaced therefrom. The device is completed by attaching electrical lead wires 32, 33 and 34 to electrodes 29, 30 and 31 respectively by, e.g., standard ultrasonic or thermocompression bonding techniques.

The control or gate electrode 31 is an insulated-gate field-effect electrode, and hence draws very little current. In the operation of the device, the electrode 29 may be made the cathode, and electrode 30 the anode. A constant voltage or potential source such as a battery 35 is connected between the source or cathode lead wire 32 and the drain or anode lead wire 33 so that cathode electrode 29 is negatively poled with respect to anode electrode 30. A signal source 36 is connected between the control or gate lead wire 34 and the cathode lead wire 32. The cathode electrode 29 is also connected to ground.

The device may be operated in two different modes, which are analogous to the operation of an insulated-gate field-effect transistor in the enhancement mode and in the depletion mode. In the depletion mode of operation, assume the potential source 35 is providing an electric field between electrodes 29 and 30 which is above the threshold value for the particular semiconductor employed, so that current oscillations are being produced between electrodes 29 and 30. The signal source 36 now provides a negative bias to the control electrode 31. The negatively charged control electrode 31 repels the negative charge carriers (electrons) from the N type active region 26, which corresponds to the channel in an insulated-gate field-effect transistor. The number of charge carriers (electrons) in N type region 26 is thus depleted. When the concentration of majority charge carriers in region 26 is reduced below a critical value, such that the product of the number of electrons per $cm^3$ times the length of region 26 in centimeters is less than about $10^{11}$ per $cm.^2$, then the oscillations will cease.

In the enhancement mode of operation, assume the potential source 35 is providing an electric field between electrodes 29 and 30 which is below the critical threshold velue required for the particular semiconductor employed. Accordingly, no current oscillations will be observed. The signal source 36 then provides a positive bias to the control electrode 31. The positively charged control electrode 31 attracts additional negative charge carriers (electrons) into N type region 26. When the concentration of charge carriers (electrons) in region 26 is increased above a critical value, such that the product of the number of electrons per $cm.^3$ times the length or region 26 in centimeters is greater than about $10^{11}$ per $cm.^2$, then current oscillations will occur in the device between electrodes 29 and 30.

In the device of Example I, the control electrode 31 covers or is co-extensive with the entire N type region 26. Alternatively, a device may be fabricated with a control electrode which lies over only part of the N type region, as described in the next example. Moreover, the N type active region or channel of the device may be made by epitaxial techniques.

*Example II*

Figure 2:
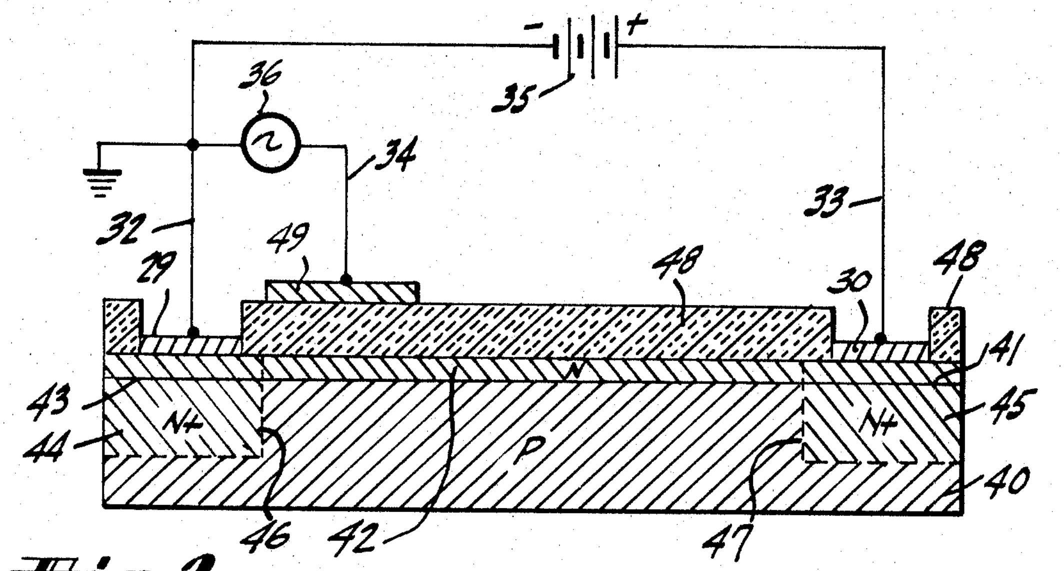
FIGURE 2 is a cross-sectional view of a bulk effect semiconductor device having an offset control electrode according to a second embodiment.

Referring now to FIGURE 2, a second embodiment comprises a monocrystalline P type indium phosphide semiconductive body or wafer 20 having a major face 41. As in the previous example, the precise size and shape of semiconductive body 40 is not critical.

An epitaxial N type indium phosphide layer 42 is deposited on wafer face 41 by any convenient technique, such as those described in RCA Review, Volume XXIV, No. 4, pp. 546–615, December 1963. A PN junction 43 is thus formed at or close to the boundary between the N type epitaxial layer 42 and the P type wafer 40.

A donor such as sulphur or selenium or tellurium is diffused into selected portions of epitaxial layer 42 so as to form two spaced N+ regions 44 and 45 which preferably extend completely through the thickness of epitaxial layer 42 and down into the wafer 40 itself. PN junctons 46 and 47 are formed at the boundary between N+ diffused regions 44 and 45 and the P type bulk of wafer 40.

An insulating coating or layer 48 is deposited over the entire epitaxial layer 42. The insulating coating 48 may consist of magnesium oxide, or of silicon oxide as in the previous example. Portions of the insulating coating 47 are removed by standard photolithographic techniques to expose two areas on epitaxial layer 42, one area being internal N+ region 44, the other area being internal N+ region 45. Two metallic electrodes 29 and 30 are ohmically bonded on epitaxial layer 42 to the two spaced N+ regions 44 and 45 respectively. As in Example I, electrodes 29 and 30 may consist of alloyed tin dots.

A metallic control or gate electrode 49 is deposited on insulating coating 48 over N type epitaxial layer 42 and between electrodes 29 and 30 by any convenient method. However, in this embodiment the metallic gate electrode 49 does not cover all of the N type region 42 between electrodes 29 and 30. One end of the electrode 49 is closer to one N+ region 44 than the other end of electrode 49 is to the other spaced N+ region 45. Electrode 49 may therefore be termed a partial gate electrode or an offset gate. The device is completed by attaching electrical lead wires 32, 33 and 34 to the electrodes 29, 30 and 49 respectively.

The device of this example is formally similar to an offset gate MOS transistor, in that an electric potential applied to the gate lead 34 results in the application of an electric field across a portion of the conductive region or channel 42 but not across the whole thereof. The operation of the offset gate device of this example is similar to that previously described for the full gate device of Example I. A constant voltage source such as a battery 35 is connected between the lead wire 32 and the lead wire 33 so that electrode 29 is negatively poled, and becomes the device cathode, while electrode 30 is positively poled, and becomes the device anode. A signal source 36 is connected between the control or gate lead wire 34 and the cathode lead wire 32. The cathode electrode 29 is also connected to ground.

In the device of Example I, the polarity of electrodes 29 and 30 may be reversed, since that device is symmetrical, as illustrated in FIGURE 1. The device of this example is not symmetrical, since the offset gate electrode 49 is closer to one device power electrode 29 than to the other device power electrode 30. It is preferred that, in the device of this example, the power electrode closest to the offset gate electrode 49, i.e., electrode 29 in this example, be made the device cathode, and be negatively poled by the potential source 35. The offset gate device of this example may be operated in either depletion or the enhancement mode, as described in connection with the full gate device of Example I.

A feature of the offset gate device of this embodiment is that the effective channel length, i.e., the effective spacing between the power electrodes of the device, is reduced by the operation of the control electrode. The output frequency of the device may thus be modulated. The effective spacing between the power electrodes 29 and 30 is reduced by an amount equal to the length of the control electrode 29 when the voltage applied to electrode 49 is sufficiently positive to form a highly conductive portion of the N type region 42 immediately beneath electrode 49. This portion of region 42 thus becomes in effect an extension of N+ region 44, and hence does not contribute to the active length of the N type channel between regions 44 and 45.

*Example III*

In the previous examples, only one control electrode was employed. In the device of the present example, a plurality of control electrodes are utilized.

Figure 3:
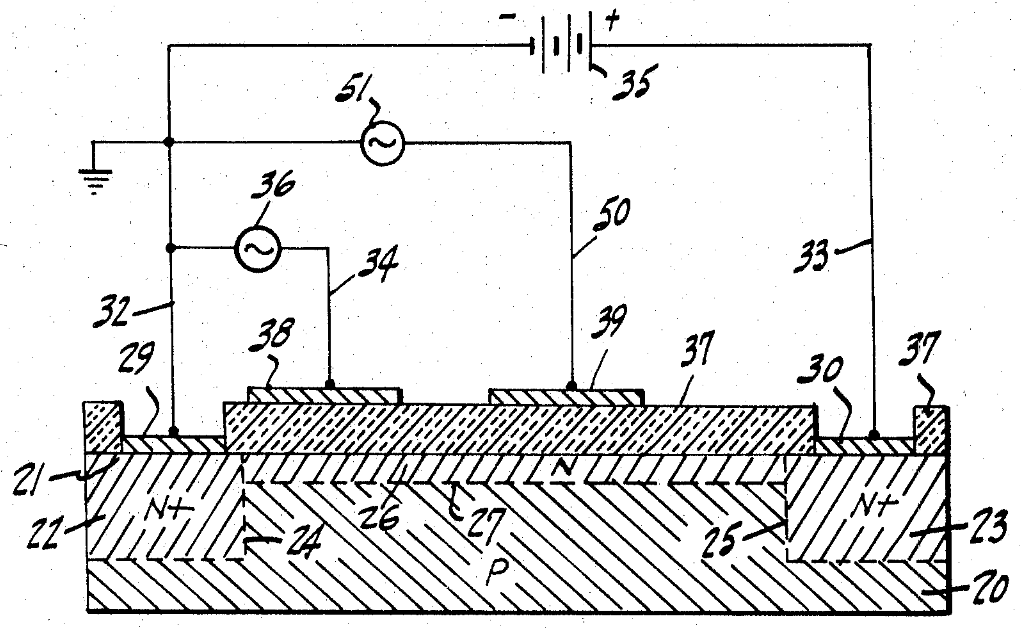
FIGURE 3 is a cross-sectional view of a bulk effect semiconductor device having a plurality of control electrodes according to a third embodiment; and, FIGURE 4 is a cross-sectional view of a bulk effect semiconductor device according to a fourth embodiment.

Referring now to FIGURE 3, the device of this example comprises a crystalline semiconductive body or wafer 20 consisting of P type gallium arsenide or indium phosphide, and having at least one major face 21. As in the first example, two spaced N+ regions 22 and 23 are formed in wafer 20 immediately adjacent major face 21 so that PN junctions 24 and 25 are formed between regions 22 and 23 and the P type bulk of wafer 20. Next, an N type region 26 is formed in wafer 20 between the spaced N+ regions 22 and 23 and immediately adjacent the one major face 21. PN junction 27 is formed between region 26 and the P type bulk of wafer 20. An insulating coating 37 is deposited on major face 21, and portions thereof internal regions 22 and 23 respectively are removed. Metallic conductive electrodes 29 and 30 are ohmically attached to N+ regions 22 and 23 respectively.

Two spaced metallic electrodes 38 and 39 are deposited on insulating coating 37 over N type region 26, and serve as the first and second control or gate electrodes respectively. Electrical lead wires 32, 33, 34, and 50 are attached to metallic electrodes 29, 30, 38 and 39 respectively.

In the operation of the device of this embodiment, a constant voltage source such as a battery 35 is connected between the lead wires 32 and 33, so that the electrode 29 is negatively poled, and becomes the device cathode, while electrode 30 is positively poled, and becomes the device anode. A first signal source 36 is connected between the cathode lead 32 and the first gate lead 34. A second signal source 51 is connected beteween the cathode lead 32 and the second gate lead 50. The cathode electrode 29 is also connected to ground.

When the device of this embodiment is operated in the enhancement mode, the coincidence of a positive signal voltage (from signal source 36) on electrode 38 and a positive signal voltage (from signal source 51) on electrode 39 is required to cause current oscillations between electrodes 29 and 30.

When the device of this embodiment is operated in the depletion mode, the occurrence of a negative signal voltage on either the first gate electrode 38 or on the second gate electrode 39 is sufficient to cause the current oscillations between electrodes 29 and 30 to cease. The device thus acts as an "AND" gate in the enhancement gate, but as an "OR" gate in the depletion mode.

*Example IV*

In the previous examples, the thickness of the insulating coating or layer beneath the control electrode was uniform. In the device of this embodiment, the thickness of the insulating layer beneath the control electrode is non-uniform, being graded from thin adjacent one spaced N+ region to thick adjacent the other spaced N+ region.

Figure 4:
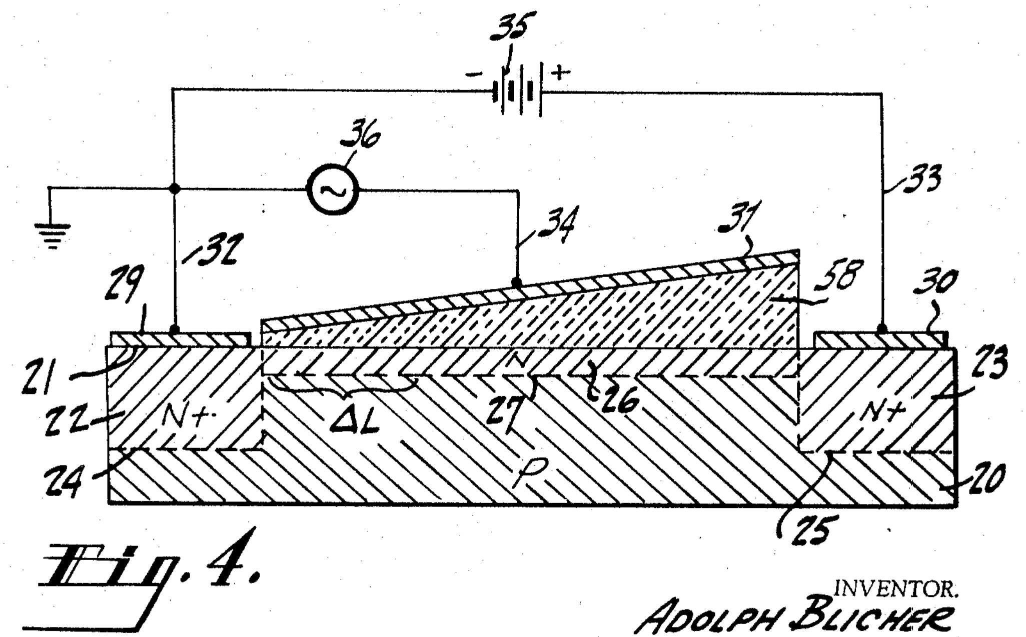

Referring now to FIGURE 4, the device of this example comprises a crystalline semiconductive body or wafer 20 having at least one major face 21, and consisting of P type conductivity monocrystalline gallium arsenide or indium phosphide, or $GaAs_{1-x}P_x$, where $x$ is a proper fraction i.e., $x$ is less than one. Two spaced high conductivity N+ type regions 22 and 23 are formed in wafer 20 adjacent major face 21 by standard techniques, as described in Example I. Rectifying barriers 24 and 25 are formed at the boundaries between the spaced N+ regions 22 and 23 respectively and the P type bulk of wafer 20. A second step, such as diffusion is then employed to form a thin N type region 26 immediately adjacent wafer face 21 between the N+ regions 22 and 23. A rectifying barrier or PN junction 27 is formed at the boundary between the N type region 26 and the P type bulk of wafer 20. Alternatively, the N type region 26 may consist of an epitaxially deposited layer, as described in Example II.

A tapered insulating layer 58, i.e., an insulating layer graded as to thickness, is deposited on wafer face 21 over the N type region 26, which corresponds to the channel of a field-effect device. The insulating layer 58 may for example consist of silicon oxide deposited from the vapor phase as described in U.S. Patent 3,089,793, issued May 14, 1963 to E. J. Jordan and D. J. Donahue. The thickness of the insulating coating may be tapered or graded by any convenient method, for example by precision lapping techniques, such as those described in U.S. Patent 3,022,568, issued Feb. 27, 1962 to H. Nelson and J. Bernath. Preferably the thickness of the insulating layer 58 is graded from thin adjacent one N+ region 22, which serves as the cathode region of the device, to thick adjacent the other N+ region 23, which serves as the anode region of the device. Metallic electrodes 29, 30 and 31 are deposited on the N+ region 23, and the insulating layer 58 respectively. Electrical lead wires 32, 33 and 34 are then attached to electrodes 29, 30 and 31 respectively.

A constant potential source such as a battery 35 is connected between the cathode lead wire 32 and the anode lead wire 33 so that cathode electrode 29 is negatively poled with respect to anode electrode 20. A signal source 36 is connected between the control lead wire 34 and the cathode lead wire 32. The cathode electrode 29 is also connected to ground.

When the device of this example is operating in the enhancement mode, so that the potential source 35 is providing a field between electrodes 29 and 30 which is above the critical threshold value required for current oscillations, the application of a specific positive potential $V_1$ by the signal source 36 to the control electrode 31 will cause the electron concentration in the N type region or channel 26 to increase. This increase in electron concentration will occur first in that part $\Delta L$ of N type channel 26 which is closest to the cathode region 22, because the insulating layer 58 is thinnest over that part of the channel, and hence the electric field is greatest in that part of the channel. When the electron connection in portion $\Delta L$ of channel 26 is sufficiently increased, so that the charge carrier concentration therein exceeds about $10^{17}$ per $cm.^3$, then the effective length of channel 26 becomes equal to the original channel length minus $\Delta L$. If the positive potential applied to control electrode 31 is now further increased to $V_2$, the portion of channel 26 which has a high charge carrier concentration is increased in length by another increment. The frequency of the generated current oscillations between electrodes 29 and 30 may thus be modulated.

The device of this example may also be operated in the depletion mode. Assume the potential source 35 is providing a field between electrodes 29 and 30 which is above the critical threshold value required for current oscillations. Assume also that the conductive channel between electrodes 29 and 30 is made highly doped, so as to have a charge carrier concentration of at least $10^{17}$ per cm.$^3$. The application of a negative potential by the signal source 36 to the control electrode 31 will reduce the electron concentration in the portion $\Delta L$ of N type region or channel 26. The reduction in electron concentration will be greatest in that portion $\Delta L$ in N type channel 26 which is closest to the cathode region 22, since the insulating layer 58 is thinnest over that part of the channel, and hence the electrical field across the insulating layer 58 is greatest in that part of the channel. When the electron concentration in portion $\Delta L$ of channel 26 is sufficiently decreased, the effective length of channel 26 is equal to $\Delta L$. Increasing the negative potential applied to control electrode 31 will increase the length of the portion $\Delta L$ of the channel 26, and thus further increase the effective length of channel 26, thereby decreasing the frequency of the current oscillations between electrodes 29 and 30. The output frequency may thus be modulated by the voltage applied to the control electrode.

A feature of the invention is the presence of at least one control electrode, which enables easy separation of input from output for the device.

The embodiments described above are by way of illustration and explanation only, but not limitation. The arrangement, shape, and number of the device electrodes may be subject to wide variations. For example, a layer of semiconductive gallium arsenide or indium phosphide may be deposited on an insulating subtrate such as glass or sapphire. Two spaced ohmic electrodes can then be deposited directly on the semiconductive layer, which serves as the channel, and an insulated-gate control electrode can be deposited on the semiconductive layer between the two ohmic electrodes. Furthermore, although the device has been described with reference to gallium arsenide and indium phosphide as the semiconductive materials, other semiconductive materials may be utilized, such as $GaAs_{1-x}P_x$, where $x$ is less than unity. Theoretically, any semiconductor may be utilized which exhibits at least two conducting band minima, wherein one minimum contains states with a high electron mobility, and the other conducting band minimum, which is displaced in momentum space and occurs at a higher level than the first minimum, has available states which can be filled with electrons of low mobility. Various other modifications may be made by those skilled in the art without departing from the spirit and scope of the invention as described in the specification and the appended claims.

What is claimed is:

1. A semiconductor device comprising:

a body of material selected from the group consisting of gallium arsenide and indium phosphide and $GaAs_{1-x}P_x$, wherein $x$ is less than 1;

two spaced $N^+$ type regions in said body immediately adjacent a surface thereof;

an N type region in said body immediately adjacent said surface between said two spaced $N^+$ regions;

two metallic electrodes ohmically attached to said two spaced $N^+$ regions respectively;

means to apply a potential between said two electrodes sufficient to maintain an electric field of the order of 3600 volts per centimeter in said N type region;

at least one insulated control electrode upon said surface over said N type region; and, means to vary the concentration of electrons in said N type region so that the product of the electron concentration per cm.$^3$ in said N type region times the length in centimeters of said N type region may be varied around a value of about $10^{11}$ per cm.$^2$.

2. A semiconductor device according to claim 1, wherein said control electrode is an insulated-gate field-effect control electrode.

3. A semiconductor device according to claim 2 having a plurality of insulated-gate field-effect control electrodes on said surface over said N type region.

4. A semiconductor device according to claim 2 wherein one end of said control electrode is closer to one of said spaced $N^+$ regions than the other end of said control electrode is to the other of said spaced $N^+$ regions.

5. A semiconductor device according to claim 2 wherein said body is of P type conductivity and said device includes electrical lead wires attached to each of said electrodes.

6. A semiconductor device according to claim 1, wherein said body is monocrystalline and of P type conductivity, and said device includes an insulating layer interposed between said N type region and a control electrode thereon.

7. A semiconductor device according to claim 6, wherein said body is gallium arsenide, and one end of said control electrode is closer to one of said spaced regions than the other end of said electrode is to the other of said spaced regions.

8. A semiconductor device according to claim 6, wherein said insulating layer is of non-uniform thickness.

9. A semiconductor device comprising:

a crystalline body of material selected from the group consisting of gallium arsenide and indium phosphide, said body having at least one major face and being of resistivity selected from the group consisting of P type and high resistivity intrinsic;

an N type epitaxial layer of material selected from the group consisting of gallium arsenide and indium phosphide on said one face of said body;

two spaced $N^+$ regions in said epitaxial layer immediately adjacent the surface thereof;

two metallic electrodes ohmically attached to said two spaced $N^+$ regions respectively;

means to apply a potential between said two electrodes sufficient to maintain a critical field of the order of 3600 volts per centimeter in said N type region;

at least one insulated-gate field-effect control electrode upon said N type epitaxial layer between said two spaced electrodes; and, means to vary the concentration of electrons in said N type layer between said two $N^+$ regions so that the product of the electron concentration per cm.$^3$ in said N type layer times the length in centimeters of said N type layer may be varied around the value of about $10^{11}$ per cm.$^2$.

10. A semiconductor device according to claim 9, wherein said body is gallium arsenide, said epitaxial layer is gallium arsenide, said insulated-gate field-effect control electrode comprises an insulating layer on said epitaxial layer between said two spaced electrodes and a metallic electrode on said insulating layer, and said device includes electrical lead wires attached to each of said electrodes.

11. A semiconductor device according to claim 10, wherein the thickness of said insulating layer is tapered from thin adjacent one of said spaced $N^+$ regions to thick adjacent the other of said other spaced $N^+$ type regions.

12. A semiconductor device comprising:

a body consisting of a crystalline semiconductor which exhibits at least two conducting band minima, wherein one conducting band minimum contains electron energy states with a high electron mobility, and the other conducting band minimum is displaced in momentum space and occurs at a higher energy level than the first minimum and has available energy states which can be filled with electrons of low mobility;

two spaced N+ type regions in said body immediately adjacent a surface thereof;

an N type region in said body immediately adjacent said surface between said two spaced N+ regions;

two metallic electrodes ohmically attached to said two spaced N+ regions respectively;

means to apply a potential between said two electrodes sufficient to maintain a critical electric field of the order of 3600 volts per centimeter in said N type region;

at least one insulated control electronde upon said surface over said N type region; and, means to vary the concentration of electrons in said N type region so that the product of the electron concentration per cm.$^3$ in said N type region times the length in centimeters of said N type region may be varied around the value of about $10^{11}$ per cm.$^2$.

References Cited

UNITED STATES PATENTS

| | | | |
|---|---|---|---|
| 3,296,462 | 1/1967 | Reddi | 307—88.5 |
| 3,321,680 | 5/1967 | Arndt et al. | 317—234 |
| 3,339,128 | 8/1967 | Olmstead et al. | 317—235 |
| 3,365,583 | 1/1968 | Gunn | 307—205 |

OTHER REFERENCES

Hochberg, "FET Gate Structure," I.B.M. Tech. Disc. Bulletin, October 1965, vol. 8, No. 5, p. 813.

Electronic Engineering, September 1965, p. 397, "A Gunn Effect Epitaxial Device for Microwave Applications."

JOHN W. HUCKERT, *Primary Examiner.*

R. SANDLER, *Assistant Examiner.*

U.S. Cl. X.R.

331—107